United States Patent

Rao

[11] Patent Number: 5,989,454
[45] Date of Patent: Nov. 23, 1999

[54] METHOD FOR MAKING SMALL PARTICLE BLUE EMITTING LANTHANUM PHOSPHATE BASED PHOSPHORS

[75] Inventor: Ravilisetty P. Rao, Highland, N.Y.

[73] Assignee: Matsushita Electric Industrial Co., Ltd., Kadoma Osaka, Japan

[21] Appl. No.: 09/110,500

[22] Filed: Jul. 6, 1998

[51] Int. Cl.⁶ ................................................. C09K 11/71
[52] U.S. Cl. ................................................. 252/301.4 P
[58] Field of Search ................................................. 252/301.4 P

[56] References Cited

U.S. PATENT DOCUMENTS

| | | | |
|---|---|---|---|
| 3,211,666 | 10/1965 | McAllister | 252/301.4 P |
| 3,507,805 | 4/1970 | Ropp | 252/301.4 P |
| 4,423,349 | 12/1983 | Nakajima et al. | 313/487 |
| 5,091,110 | 2/1992 | Fan et al. | 252/301.4 P |
| 5,132,042 | 7/1992 | Chau et al. | 252/301.4 P |
| 5,154,852 | 10/1992 | Chau | 252/301.4 P |
| 5,340,556 | 8/1994 | Collin et al. | 423/263 |
| 5,651,920 | 7/1997 | Chau et al. | 252/301.4 P |
| 5,746,944 | 5/1998 | Braconnier | 252/301.4 P |

FOREIGN PATENT DOCUMENTS

| | | |
|---|---|---|
| 0199200A2 | 4/1986 | European Pat. Off. . |
| 59-179578 | 10/1984 | Japan . |
| 2124243 | 7/1983 | United Kingdom . |

OTHER PUBLICATIONS

Chemical Abstract citation 103:202470: Mikhal'chenko et al, "Radiation Stability of Crystallophosphors for Radioluminescent Emitters", 1985 * no month.

Primary Examiner—C. Melissa Koslow
Attorney, Agent, or Firm—Ohlandt, Greeley, Ruggiero & Perle

[57] ABSTRACT

Small particle lanthanum, thulium phosphate phosphors are produced by thermal decomposition of gels or solutions or powders including lanthanum, thulium, lithium and alkaline earth salts and an organic precursor such as trimethyl phosphate and boric acid at a temperature well below the normal temperature of solid state reaction. The phosphor of the present invention has the empirical formula:

$$(La_{1-x-y-z}Tm_xLi_ySr_z)PO_4$$

wherein: $0.001 \leq x \leq 0.05$; $0.01 \leq y \leq 0.05$; and $0.0 \leq z \leq 0.05$ and exhibits a narrow band emission in blue region, peaking at 453 nm when excited by 147 and 173 nm radiation from Xenon gas mixture. The phosphor exhibits uniform and spherical shape particles in the range 0.1 to 5 microns, and is appropriate for thin phosphor screens required for a variety of flat panel display and lamp applications. The particle size varies with method of preparation. The phosphors also exhibit high brightness, good color saturation, better stability and shorter persistence when excited with 147 and 173 nm radiation than the currently available commercial phosphor, $Eu^{2+}$ actvated barium magnesium aluminate for plasma display panels.

15 Claims, 7 Drawing Sheets

METHOD FOR MAKING SMALL PARTICLE BLUE EMITTING LANTHANUM PHOSPHATE BASED PHOSPHORS

FIELD OF THE INVENTION

This invention relates to improved blue emitting small particle lanthanum phosphate phosphor particles doped with thulium as an activator and optionally, with lithium and / or strontium as coactivators, and a method of forming such particles. More specifically, this invention relates to novel phosphor particles and a method of forming such particles from respective nitrates, hydroxides and organic precursors, which method forms small particles that provide improved performance (good color saturation or color purity, longer life time, shorter persistence and better stability) required for flat panel display (FPD) and lamp applications.

BACKGROUND OF THE INVENTION

Plasma display panels (PDP), as used in high definition television (HDTV) and projection television (PTV) applications, conventionally use di-valent europium activated barium magnesium aluminate (BAM) phosphor as a blue emitting component due to its availability and high quantum efficiency. However, compared with other phosphors such as $Eu^{3+}$ (red) and $Tb^{3+}$ (green) activated yttrium, gadolinium borate based phosphors (BAM) exhibits a wide spectrum of emission with lower color purity and very short lifetime with the VUV flux. Therefore, efforts have been made to develop new phosphors to replace BAM and to provide improved performance characteristics. Lifetime of a plasma display is directly related to the performance of phosphors used in the display. Therefore, lifetime of phosphors is a great concern in selecting suitable phosphors. Displays should exhibit lifetimes of the order of 30,000 hours of operation.

Most of the work reported to date on lanthanum phosphate based phosphors has been related to fluorescent lamp applications as an efficient green phosphor and the performance of the phosphor therein. Development of terbium and cerium activated lanthanum phosphate is well documented in numerous patents. Different methods of preparation and the introduction of various impurities have been tried in attempts to improve the life and performance of the lamp. U.S. Pat. No. 4,423,349 to Nakajima et. al. describe two methods of synthesizing the above phosphor. In the first method, lanthanide carbonates are reacted with phosphoric acid at 75° C. and then calcinated at 1150° C. for 75 minutes. In the second method, coprecipitated lanthanide oxalates are oxidized to a single phase lanthanide oxide at 800° C. Diammonium phosphate is mixed with the oxide and fired at 1200° C. Boron oxide or ammonium borate is also added before calcination to enhance the reaction and also improve the brightness.

U.S. Pat. No. 5,091,110 to Albert et. al. discloses a method of making lanthanum cerium terbium phosphate phosphor in a two step process. The method comprises formation of an aqueous solution of lanthanide nitrates and an aqueous solution of diammonium phosphate and combining both to coprecipitate a lanthanum terbium cerium phosphate followed by firing the mixture at higher temperatures to form the phosphor. Boron phosphate is used as the phosphate source because it is stable at elevated temperatures (see U.S. Pat. No. 5,132,042). Lithium carbonate is also used as a flux forming compound to improve the solubility of the lanthanide phosphate in the boron oxide solution formed during the process (see U.S. Pat. No. 5,154,852).

Terbium, cerium activated lanthanum phosphate is also prepared by reacting monoammonium phosphate solution and respective rare earth nitrate solutions (U.S. Pat. No. 5,340,556 to Collin et al.). The resultant powder is calcined at 900° C. in air or in a non reducing atmosphere to obtain a phosphor with 250 nm compact aggregates. From XRD analysis, it is found that the resultant phosphor powder has monoclinic crystal structure. Small size phosphor particles could be prepared by adding excess boric acid and lithium carbonate as a flux in the starting mixture before firing (see U.S. Pat. No. 5,651,920 to Chau et al.).

U.S. Pat. No. 5,746,944 to Braconnier et al. disclose a lanthanun/cerium/terbium mixed green phosphor that is directly precipitated by reacting a first solution of soluble lanthanum, cerium and terbium salts with a second solution containing phosphate ions.

HDTV and similar type display devices should have high resolution and high brightness to meet expected performance. This can be achieved currently only with thin phosphor screens consisting of very small phosphor particles (0.5–2 microns) in a close rib structure. Screens with small particles have higher packing density and also need lesser binder content. It is known that terbium and cerium activated lanthanum phosphate have high quantum efficiency, better stability at operating temperatures and long lifetime, particularly under 254 nm UV excitation (compact fluorescent lamps). However, very limited information is available on the preparation and luminescent studies on thulium activated lanthanum phosphate phosphors.

SUMMARY OF THE INVENTION

Accordingly, it is an object of the present invention to provide $Tm^{3+}$ as an activator and $Li^+$ and /or $Sr^{2+}$ as coactivators in lanthanum phosphate phosphor having the empirical formula:

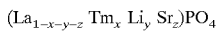

$(La_{1-x-y-z} Tm_x Li_y Sr_z)PO_4$ wherein: $0.001 \leq x \leq 0.05$; $0.01 \leq y \leq 0.05$; and $0.0 \leq z \leq 0.05$, which method provides the phosphor in the form of a powder having a small particle size which displays improved brightness.

Phosphors are synthesized by three different processes, viz., solid state reaction, solution and sol-gel processes depending on the required particle size distribution. The sol-gel process is appropriate for preparing sub-micron size particles (0.05 to 1 microns), the solution process is for fine particles (0.05 to 2 microns) and the solid state reaction is for normal size particles (0.1 to 4 microns). In the case of the solution process, respective salt solutions of low molar concentration are mixed and subjected to reflux in an acid medium. Fine powders result after slow drying of these solutions.

Sol-gel processes offer many advantages over conventional methods in the synthesis of fine powders and particularly phosphor materials. Since all of the starting materials are mixed at the molecular level in a solution, a high degree of homogeneity is achievable. Doping of impurities (activators/ coactivators/ sensitizers) through solutions is straightforward, easy and effective. The pores in properly dried gels are often extremely small and the components of a homogenous gel are intimately mixed. The surface area of powders produced from sol-gel is very high, leading to lower processing temperatures.

Phosphor materials are extremely sensitive to impurities; even in ppb levels, the low-temperature process through solution, as well as sol-gel process, minimizes the potential for cross contamination. Some of the unwanted impurities left in the materials from conventional methods may pose a threat to the performance of a phosphor in a display. As the size of the phosphor particle decreases, the probability of electron and hole (e-h) capture to the impurity increases and the e-h localization enhances the recombination rate via the impurity. The optimum impurity concentration (activator) level can be further increased with small particle size.

The present invention is related to the growth of $Tm^{3+}$, $Sr^{2+}$ and $Li^+$ doped lanthanum phosphate phosphor by sol-gel, solution and solid state methods. More specifically, the present invention provides a process for forming a $Tm^{3+}$, $Sr^{2+}$ and $Li^{1+}$ doped lanthanum phosphate phosphor having the empirical formula:

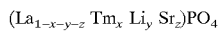

$(La_{1-x-y-z} Tm_x Li_y Sr_z)PO_4$ wherein: $0.001 \leq x \leq 0.05$; $0.01 \leq y \leq 0.05$; and $0.0 \leq z \leq 0.05$.

The method includes the steps of:

(1) reacting a dilute solution comprising a source of lanthanum, a source of thulium, a source of lithium, a source of strontium and an organic precursor providing a source of phosphorus, in an acid medium to form a sol and/ or a gel; and (2) thermally decomposing the powders obtained from the above, at a temperature below a solid state reaction temperature (e.g., 900° C. for 6 hours); or (3) mixing powdered sources of lanthanum, thulium, optionally lithium and / or strontium and an inorganic precursor providing a source of phosphorus to form a mixed powder; and, (4) firing the mixed powder at a solid state reaction temperature.

DETAILED DESCRIPTION OF THE INVENTION

Figure 1:
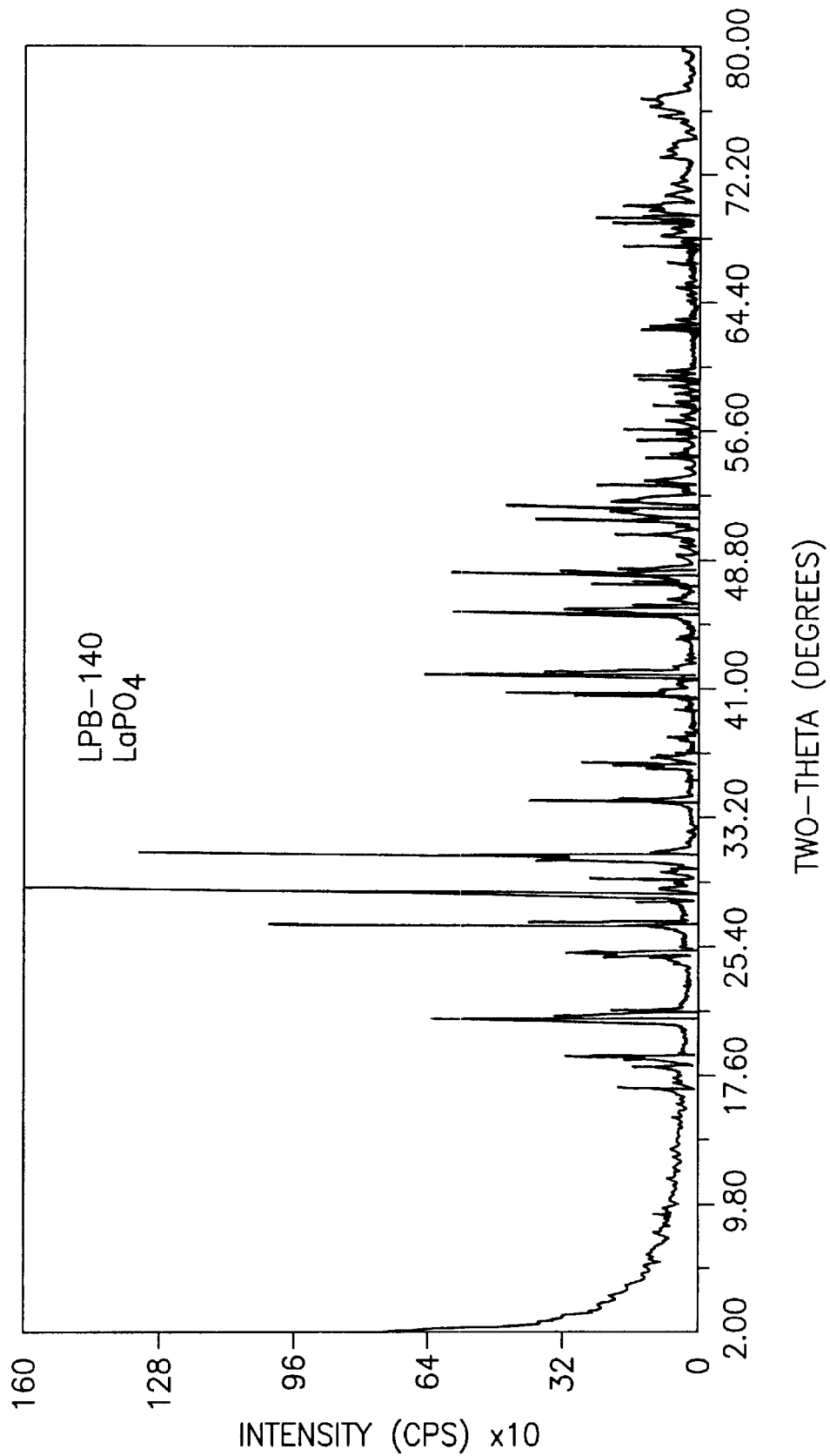
FIG. 1 shows an X-ray diffraction pattern of a $LaPO_4$:Tm,Li phosphor.

For a display, lifetime is a very critical issue. In most displays and lamps, blue phosphor is a weak component due its shorter life time when compared with other phosphors (green and red). Since commercially available divalent europium activated barium magnesium aluminate-based phosphors fail to satisfy the current display lifetime requirements, a new phosphor and its synthesis process that overcomes the above limitations was developed. The small size phosphor particles are particularly suitable for use in applications in which a high packing density is required. The result of this development effort is the basis of the present invention.

This invention provides a method of synthesizing lanthanum phosphate phosphors incorporating moderate concentrations of activator ion ($Tm^{3+}$) and trace amounts of $Sr^{2+}$ and / or $Li^+$. The formation of an alkaline earth, e.g., solid solution, which is critical, mainly depends upon the reaction temperature and conditions. In the solid state reaction, respective oxides are reacted at higher temperatures in the presence of excess phosphate. At these temperatures, there is every possibility for formation of other phases, such as individual phosphates and unreacted oxides of lanthanum, thulium, etc. Proper doping of impurity ions into the lattice of the complex is uncertain. Finally, the high temperature process will lead to growth of larger particles (>5 microns).

The Sol-gel process can be divided into two categories; one, an aqueous-based process that starts from a solution of a metal salt and second, an alcohol-based process that starts from a metal alkoxide. In this invention, the aqueous based process is adopted by considering the cost and availability of the starting chemicals. Because metal alkoxides are expensive, nitrates of lanthanum and thulium are selected as a metal source and trimethyl phosphate is selected as a phosphate source.

Initially, trimethyl phosphate stock solution is prepared by mixing trimethyl phosphate and ethanol in 1:10 ratio. To further understand these materials, a number of phosphors were prepared under different conditions. Metal precursors were synthesized by adopting the following route:

The lanthanum hydroxide precursor was prepared by precipitating an aqueous solution of $LaCl_3$ or $La(NO_3)_3$ (0.01M) in water by the addition of a base, such as ammonium hydroxide, to the solution. A gelatinous precipitate with pH=10.0 to 10.4 was obtained. These gels were washed a number of times with DI water to remove counter ions ($NO_3^-$ or $NH_4^+$).

The following sol gel process was used to form a xerogel product. Required metal solutions were prepared by mixing appropriate amounts of respective metal nitrates in a luke warm DI water to obtain 0.05 to 1.0 M solutions. Stoichiometric quantities of metal (La, Tm, Sr and Li) nitrate or hydroxide solutions and trimethyl phosphate were added together so that the metal to phosphate ratio was always in the range 0.98 to 1.02. The metal/phosphate solution was transferred to a round bottom flask and peptized at 80 to 100° C. for 9 to 18 hours in a stirrer mantle. In the present invention, boric acid has been tried. Boric acid is appropriate as it acts as an acid catalyzer as well as flux during the calcination.

After the pepitization, the sol gel product was left in a container until it became a thick gel (5 to 7 days) and then a xerogel. The xerogel was transferred into a lab oven at 60 to 70° C. and left for a day or until a powder formed. These powders were transferred into a high grade alumina crucible and subjected to two heat cycles. In the first heat cycle, the sample was soaked for 2 hours at 350° C. and then heated to 800 to 1000° C. for 2 to 12 hours. After cooling to room temperature, a small quantity of water was added. The water pulped the hard mass into fine particles. The fine powder was then washed with deionized water and dried at 100° C. for 4 to 6 hours.

Thermal analysis of phosphor samples containing various proportions of metal provide insight into the reaction kinetics. The data reveals that the samples have undergone two to three successive weight changes into three different temperature regions. The first one, occurring around 100° C., corresponds to loss of free water molecules associated with respective metal salt solutions. The second weight loss, around 200 to 300° C., is due to the loss of —$CH_3O$ through oxidation.

X-ray powder diffraction data on samples fired at 1050° C. is shown in FIG. 1. The samples fired at 900° C. show some of the lines corresponding to the lanthanum phosphate phase. All the prominent lines corresponding to lanthanum phosphate phase are observed in samples fired above 950° C. This indicates that the samples are completely converted to respective phosphate as no lines corresponding to any of these metal nitrates or oxides are observed. This conclusion is also supported by TGA data. The lines corresponding to metal phosphate phase are more prominent with increasing firing temperatures.

Figure 2A:
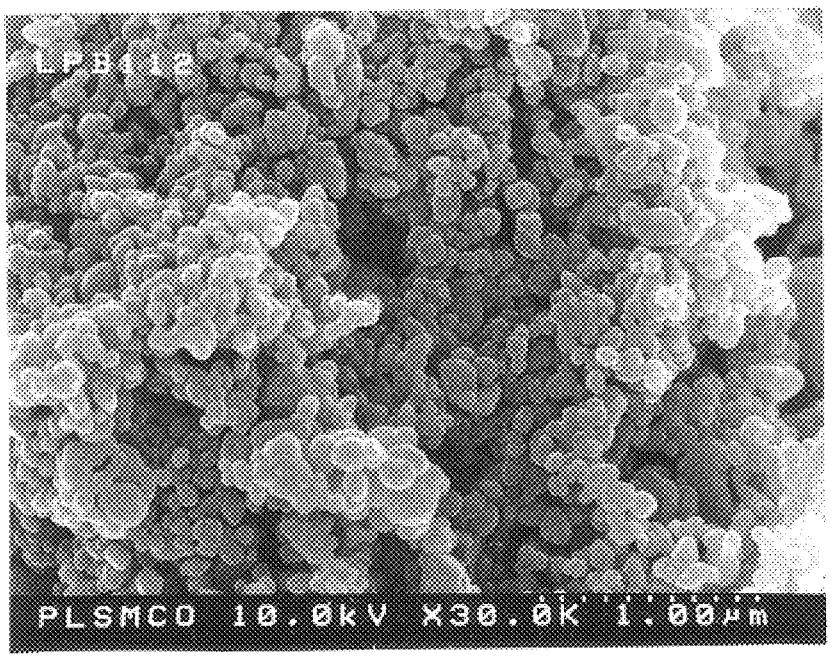
FIG. 2a illustrates scanning electron micrographs of $LaPO_4$:Tm,Li phosphors prepared from a sol-gel process.
Figure 2A:
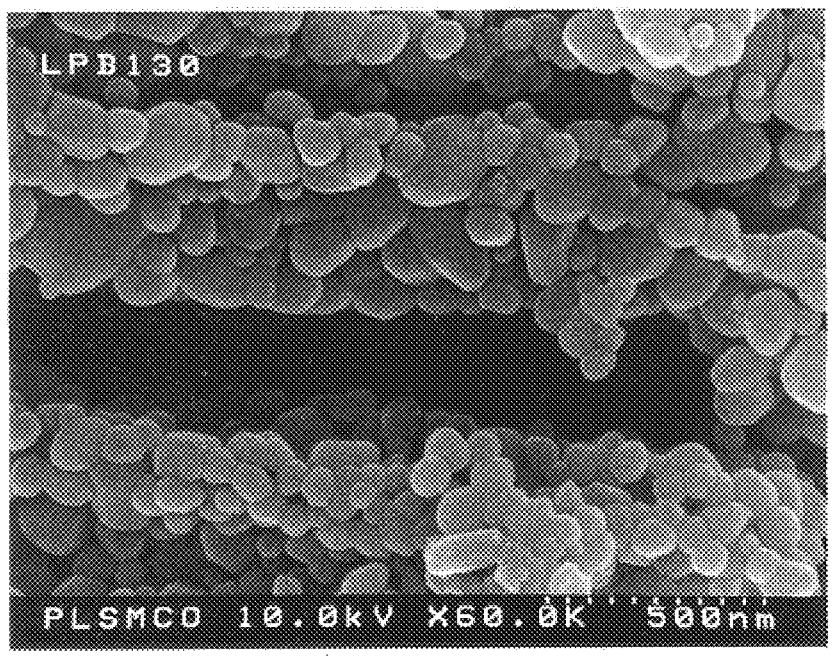
Figure 2B:
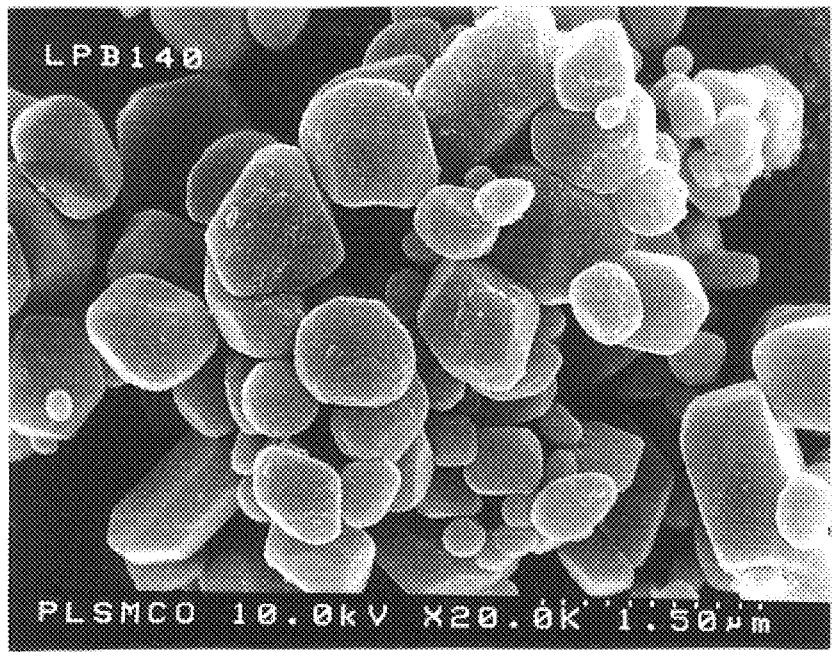
FIG. 2b illustrates scanning electron micrographs of $LaPO_4$:Tm,Li phosphors prepared from an RE solid state process.
Figure 2B:
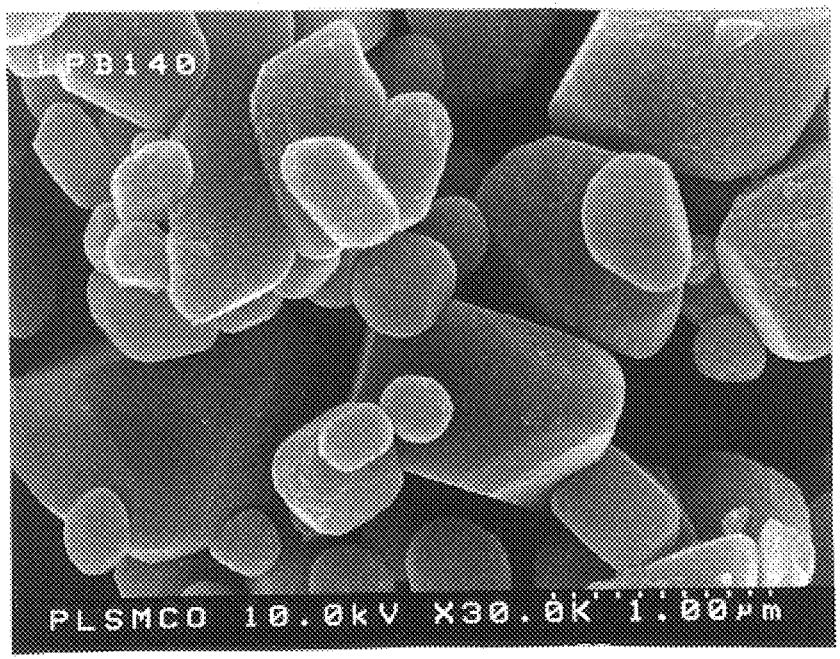

Since the luminescence of a phosphor depends on the shape, size, crystallinity, defects and grain boundaries, the morphology and PSD of all the samples prepared at various conditions were studied. Scanning electron micrographs of phosphor samples prepared at various conditions are shown in FIGS. 2a and 2b. From the micrographs, one can observe that the phosphor particles are uniform and exhibit spherical shapes.

Figure 3A:
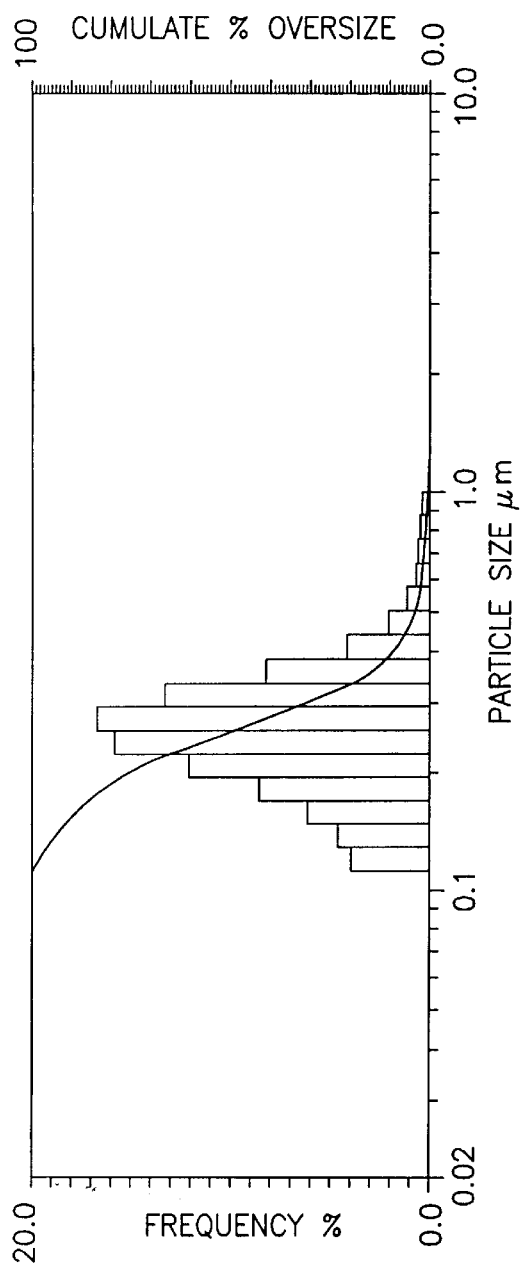
FIG. 3a graphs the particle size distribution $LaPO_4$:Tm,Li phosphors prepared from a sol-gel process.
Figure 3B:
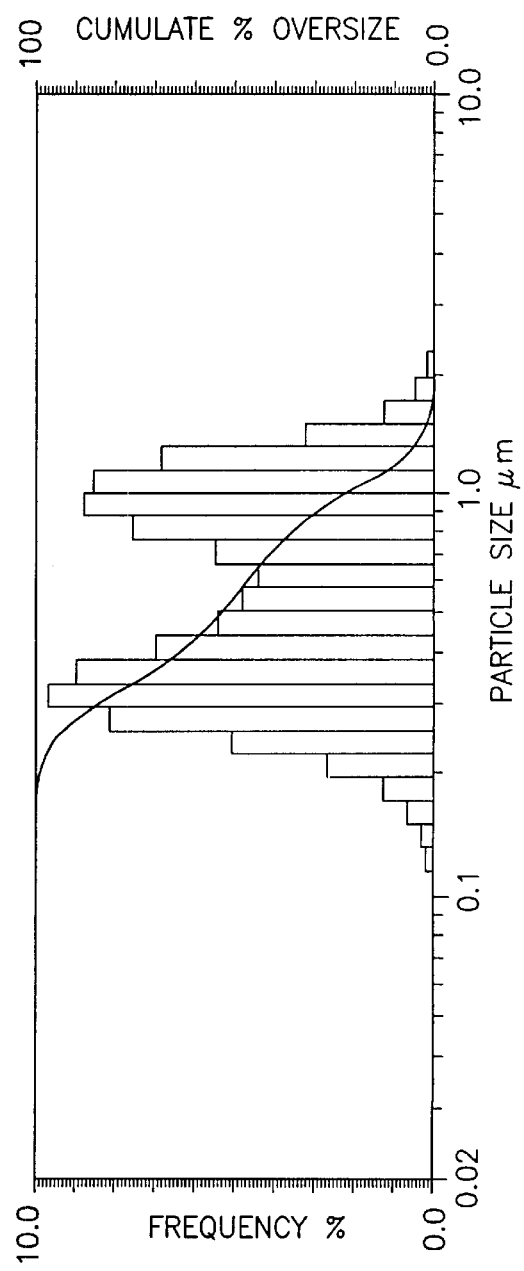
FIG. 3b graphs the particle size distribution $LaPO_4$:Tm,Li phosphors prepared from a solid state process.

The particle size distribution (PSD) of phosphors prepared from hydroxides and nitrates are shown in FIGS. 3a and 3b. The samples were washed with water after calcination to eliminate very small particles (<0.05 microns) as well as organic residues and were allowed to dry. The emission characteristics of these phosphors were carried out on powders, at room temperature.

Figure 4A:
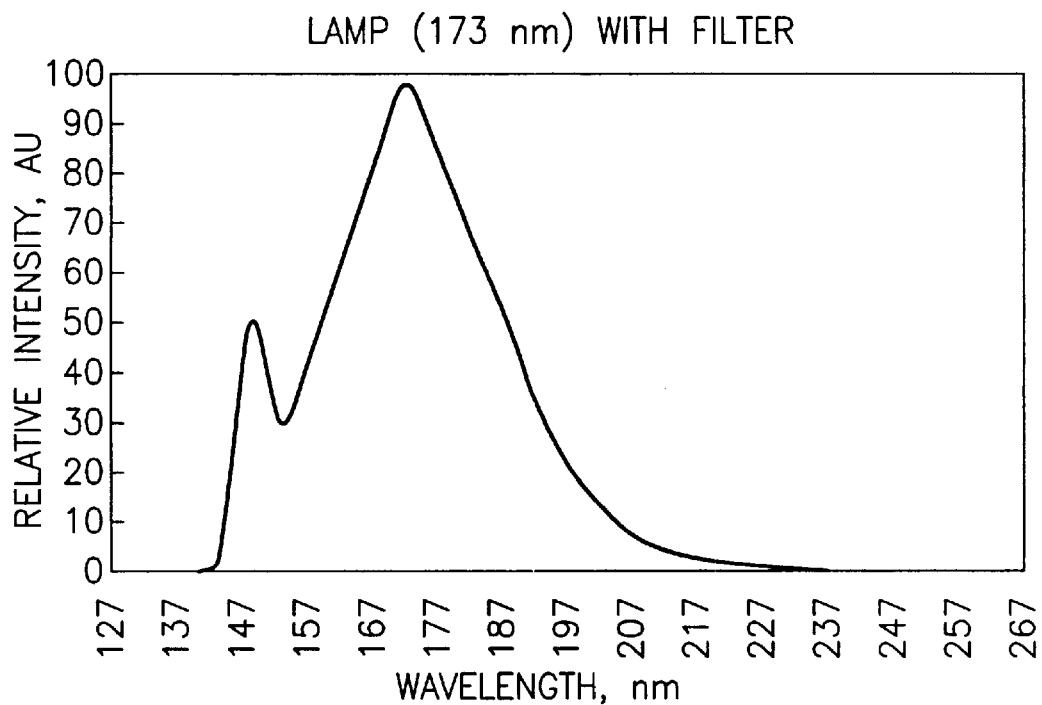
FIG. 4 provides spectral distribution of radiation energy from Xe lamps with $MgF_2$ windows and suitable band pass filters at wavelengths of (a)147 nm and (b)173 mm.
Figure 4B:
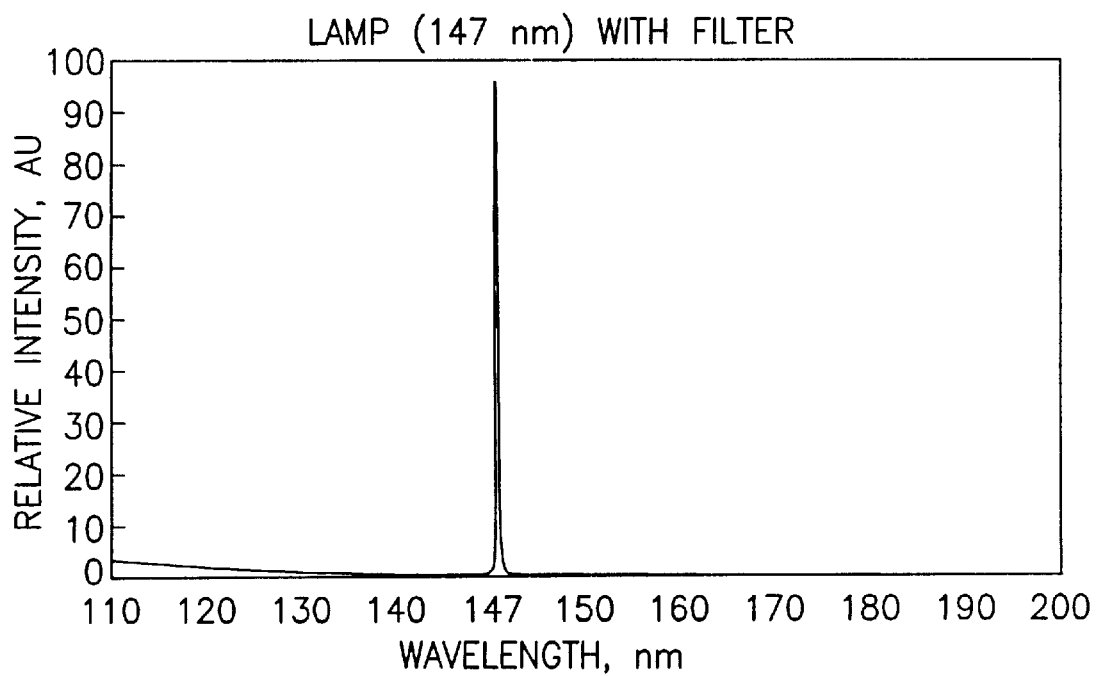
Figure 5:
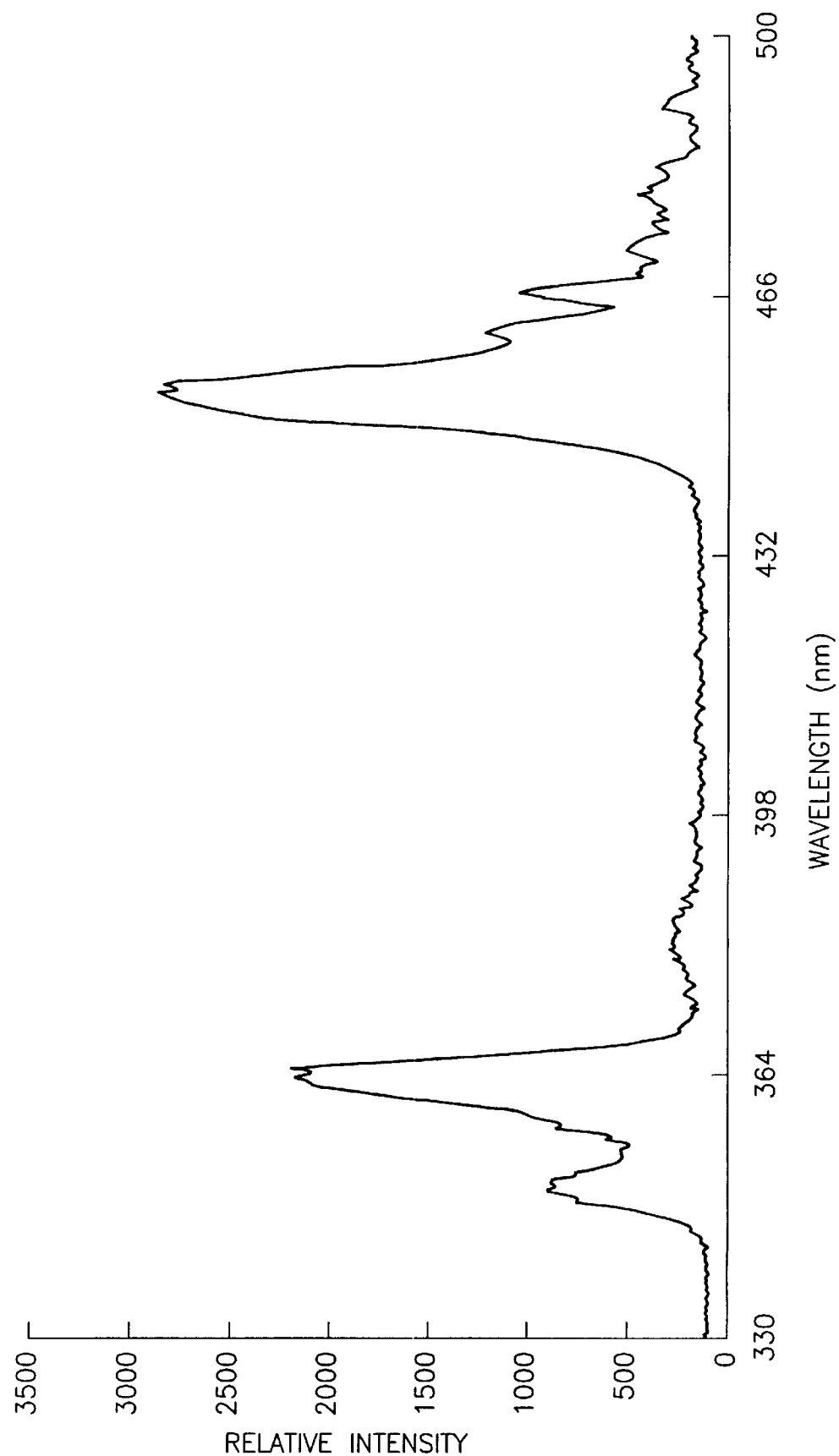
FIG. 5 shows emission spectra of $LaPO_4$:Tm,Li phosphors at 147 nm excitation.
Figure 6:
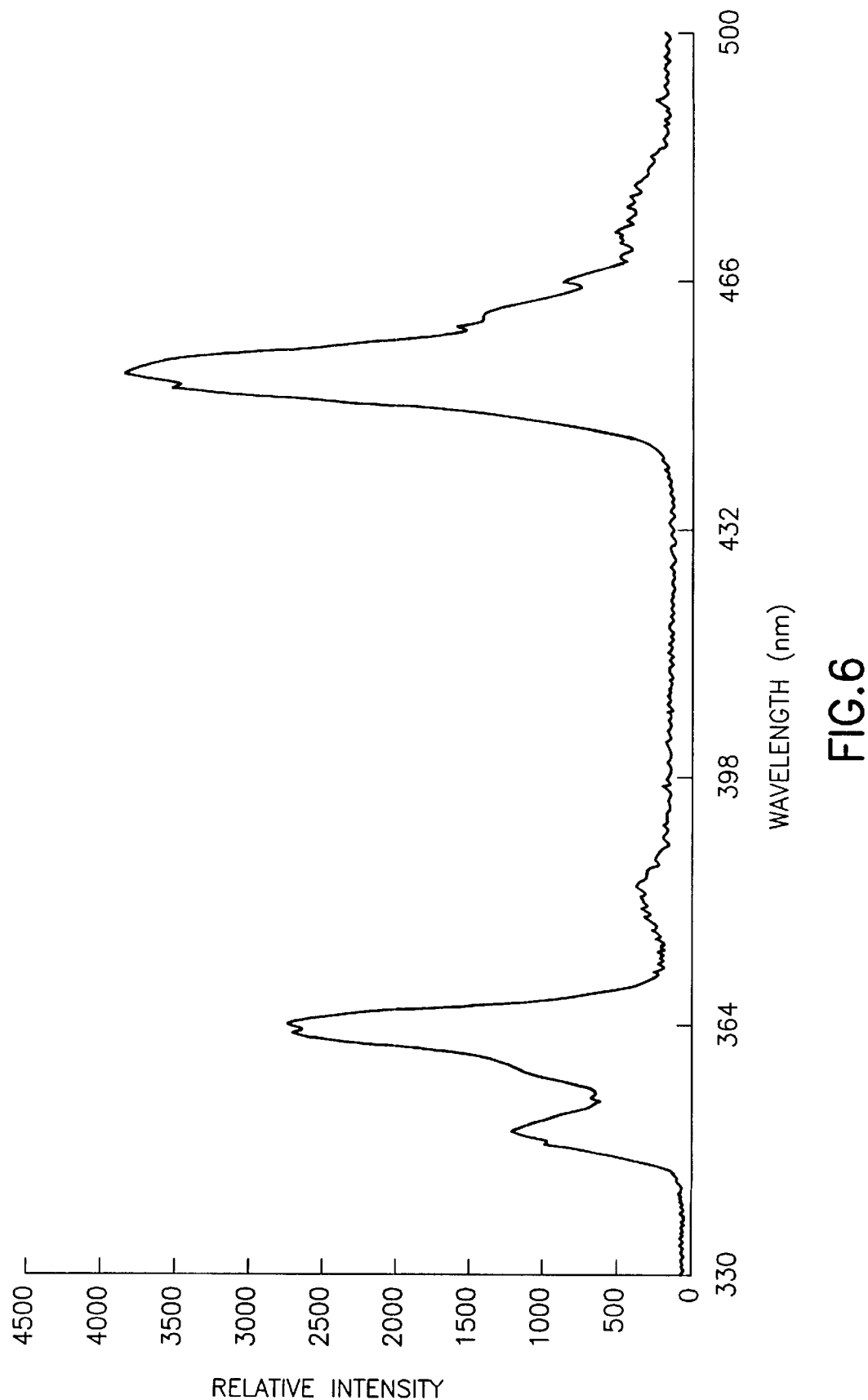
FIG. 6 shows emission spectra of $LaPO_4$:Tm,Li phosphors at 173 nm excitation.

Phosphor samples were exposed to different custom made Xenon lamps corresponding 147 and 173 nm, with a $MgF_2$ window and suitable band pass filters. Two emission lines at 360 and 451 nm correspond to the $1D_2 \rightarrow {}^3H_6$ and $1D_2 \rightarrow {}^3H_4$ transitions in $(4f)^{12}$ electronic configuration of $Tm^{3+}$ ions. The emission spectra of $Tm^{3+}$ doped lanthanum phosphate phosphors prepared from metal nitrates are shown in FIGS. 4 and 5. The emission lines around 360 nm are not in the visible region but they enhance the color temperature of the phosphor. A particularly suitable phosphor can contain from about 52.3 wt. % to about 59.34 wt. % of lanthanum, from about 0.06 wt. % to about 2.97 wt. % of thulium, from 0 wt. % to about 0.15 wt. % of lithium, from 0 wt. % to about 1.35 wt. % of an alkaline earth and about 13.0 wt. % to about 15.5 wt. % of phosphor. All weight percentages are based on the total weight of the phosphor.

Further details of this invention will be described with reference in the following examples.

EXAMPLE I

The preparation of thulium doped lanthanum phosphate phosphor employing the hydroxides of lanthanum, thulium, lithium and an acid catalyzer by a sol-gel process is described in this example. The following starting materials were used. The amounts of respective hydroxide solution (semi-gels) and phosphate solutions, in volume and percentage by weight per batch, are described in Table I.

TABLE I

| Chemical | Quantity (CC) | Element (Gm) | Mol. % |
|---|---|---|---|
| Lanthanum Hydroxide (0.01M) | 965 | 1.342 | 96.5 |
| Thulium Hydroxide (0.01M) | 25 | 0.042 | 2.5 |
| Lithium Hydroxide (0.01M) | 10 | 0.0005 | 1.0 |
| Trimethyl Phosphate (0.1M) | 12 | 0.3235 | — |
| Boric Acid (1M) | 12 | 0.13 | — |

The above hydroxide solutions are mixed in a round bottom flask. Required quantities of trimethyl phosphate solution are added slowly to the hydroxide solution while stirring at 45° C. Small quantities of inorganic acid (nitric or hydrochloric) are added drop wise along with boric acid when the solution attains maximum required temperature (90–95° C.) and the solution is then peptized at that temperature for about 9–12 hours. A water condenser column is maintained at 20° C. throughout the pepitization by use of a circulating chiller. After cooling the flask to room temperature, the solution (semi-gel) is transferred to a crystallizing dish (3 L capacity) and left in an open atmosphere. After 4 to 5 days, the solution becomes a semi-gel.

The transparent semi-gels are left at 45 to 50° C. for 12 hours in a lab oven. The loose mass from the glass dish is crushed in a glass mortar and pestle. A fine powder is collected into a crucible and fired at 300° C. for 2 hours (rate of heating is 2°/min.) and then 900° C. for 6 hours, with the same rate of heating, in a box furnace. The sample is left in the furnace until it cools down to room temperature.

A hard mass is obtained after cooling. A small quantity of water pulps the hard mass into fine particles. These fine phosphor powders are subjected to ultrasonic agitation in water. Ultrasonic treatment helps to break the clusters into very small particles. After washing with water, these powders are dried at 100° C. for 6 hours. To recover sub-micron size particles (<0.05 micron), the solution with phosphor was centrifuged. Depending on the required amounts, this can be scaled up to ten times or more. Quantitative analysis by CHN analysis and plasma emission spectroscopy of the above phosphor are shown in Table II.

TABLE II

| Element | % by wt. |
|---|---|
| C | 0.05 |
| H | 0.00 |
| N | 0.04 |
| $Li_2O$ | 0.06 |
| $P_2O_5$ | 30.40 |
| $La_2O_3$ | 67.38 |
| $Tn_2O_3$ | 2.07 |

The emission characteristics of these phosphors, were studied separately by exciting with 147 and 173 nm excitation sources (Xe lamp), and are given in Table IX below. For comparison, average particle size is also mentioned in the same table.

EXAMPLE II

The preparation of thulium doped lanthanum phosphate phosphor by a sol gel method in accordance with the present invention, employing lanthanum nitrate, thulium nitrate, lithium nitrate and trimethyl phosphate in an acid catalyzer is described in this example. Starting materials used in the present example in grams and percentage by weight are listed in Table III.

TABLE III

| Chemical | Quantity (CC) | Element (Gm) | Mol. % |
|---|---|---|---|
| Lanthanum Nitrate (0.02M) | 965 | 2.683 | 96.5 |
| Thulium Nitrate (0.02M) | 25 | 0.084 | 2.5 |
| Lithium Nitrate (0.02M) | 10 | 0.001 | 1.0 |
| Trimethyl Phosphate (0.1M) | 12 | 0.674 | 0.1 |
| Boric Acid (1M) | 12 | 0.13 | 1.0 |

The above nitrate solutions were mixed in a round bottom flask. Required quantities of methyl phosphate solution were added slowly to the nitrate solution while stirring at 45° C. The solution was peptized at 90° C. for about 12 hours. The remaining preparative procedure is the same as mentioned in Example I. The CHN analysis of the above phosphor is shown in Table IV:

TABLE IV

| Element | % by wt. |
|---|---|
| C | 0.07 |
| H | 0.02 |
| N | 0.06 |

The emission characteristics of these phosphors, studied separately by exciting with 147 nm and 173 nm excitation sources (Xe lamp), are given in Table IX. For the purpose of comparison, average particle size of each sample is also mentioned in the same table.

EXAMPLE III

The preparation of thulium doped lanthanum phosphate phosphor by a sol gel method in accordance with the present invention, employing lanthanum nitrate, thulium nitrate, lithium nitrate, strontium nitrate and trimethyl phosphate in an acid catalyzer is described in this example. Starting materials used in the present example in grams and percentage by weight per batch are shown in Table V.

TABLE V

| Chemical | Quantity (CC) | Element (Gm) | Mol. % |
|---|---|---|---|
| Lanthanum Nitrate (0.02M) | 955 | 2.655 | 95.5 |
| Thulium Nitrate (0.02M) | 25 | 0.084 | 2.5 |
| Lithium Nitrate (0.02M) | 10 | 0.001 | 1.0 |
| Strontium Nitrate (0.02M) | 10 | 0.013 | 1.0 |
| Trimethyl Phosphate (0.1M) | 25 | 0.674 | 0.1 |
| Boric Acid (1M) | 25 | 0.27 | 1.0 |

The above nitrate solutions were mixed in a round bottom flask. Required quantities of methyl phosphate solution were added slowly to the nitrate solution while stirring at 45° C. The solution was peptized at 90° C. for about 12 hours. The remaining preparative procedure (pulping washing and drying) is the same as mentioned in Example I. CHN analysis of the above phosphor is shown in Table VI:

TABLE VI

| Element | % by wt. |
|---|---|
| C | 0.04 |
| H | 0.00 |
| N | 0.07 |

The emission characteristics of these phosphors, studied separately by exciting with 147 and 173 nm excitation sources (Xe lamp), are given in Table IX. For the purpose of comparison, average particle size of each sample is also mentioned in the same table.

EXAMPLE IV

The preparation of thulium doped lanthanum phosphate phosphor by a solid state reaction in accordance with the present invention, employing lanthanum nitrate, thulium nitrate, lithium nitrate, ammonium dihydrogen phosphate and boric acid is described in this example. Starting materials used in the present example in grams and percentage by weight per batch are shown in Table VII.

TABLE VII

| Chemical | Quantity (Gm) | Element (Gm) | Mol. % |
|---|---|---|---|
| Lanthanum Nitrate | 8.36 | 2.683 | 96.5 |
| Thulium Nitrate | 0.18 | 0.084 | 2.5 |
| Lithium Nitrate | 0.14 | 0.001 | 1.0 |
| Ammonium dihydrogen Phosphate | 3.2 | — | — |
| Boric Acid | 1.0 | — | — |

The above nitrates, ammonium dihydrogen phosphate and boric acid powders are mixed and ground in an alumina mortar with the help of a pestle. The resultant mixture is fired at a solid state reaction temperature. The remaining preparative procedure (pulping washing and drying) is the same as mentioned in Example I. CHN analysis of the above phosphor is shown in Table VIII:

TABLE VIII

| Element | % by wt. |
|---|---|
| C | 2.92 |
| H | 0.09 |
| N | 0.15 |

The emission characteristics of these, studied separately by exciting with 147 nm and 173 nm excitation sources (Xe lamp), are given in Table IX. For comparison, average particle size is also mentioned in the same table.

TABLE IX

| Phosphor | Relative Intensity @ Excitation | | Color Coordinates | | Particle Size |
|---|---|---|---|---|---|
| | 147 nm | 173 nm | x | y | ($\mu$m) |
| Example-1 | 97 | 98 | 0.1442 | 0.0371 | 0.05–1.0 |
| Example-2 | 100 | 100 | 0.1441 | 0.0371 | 0.05–2.0 |
| Example-3 | 98 | 98 | 0.1444 | 0.0369 | 0.05–2.0 |
| Example-4 | 94 | 97 | 0.1440 | 0.0370 | 0.05–3.0 |

As the data of Table IX demonstrates, the phosphors of Examples 1 through 4, formed by sol/gel and sol/sol and solid state reaction processes of the present invention, provide various particle size ranges, while also generally providing a higher level of color saturation, brightness, shorter persistence and longer lifetime.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method of forming a thulium activated lanthanum phosphate phosphor having the empirical formula:

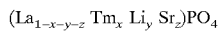

wherein: $0.001 < x < 0.05$; $0.01 < y < 0.05$; and $0.0 < z < 0.05$;
said method comprising the steps of:
reacting in an acid medium a dilute solution comprising a source of lanthanum, a source of thulium, a source of lithium, a source of strontium and an organic precursor providing a source of phosphorus to form a gel and thermally decomposing said gel at a temperature below a solid state reaction temperature to obtain said phosphor.

2. The method of claim 1, wherein said source of lanthanum and thulium is selected from the groups consisting of respective hydroxides, and said organic precursor providing a source of phosphorus is trimethyl phosphate.

3. The method of claim 1, wherein said source of lanthanum and thulium is selected from the groups consisting of respective nitrates, and said organic precursor providing a source of phosphorus is trimethyl phosphate.

4. The method of claim 1, wherein said gel is thermally decomposed in an open atmosphere, at a temperature equal or less than 950° C.

5. The method of claim 1, wherein said gel is dried to form a xerogel and said xerogel is crushed to form a powder prior to thermal decomposition.

6. The method of claim 1, wherein said phosphor has spherical particles having an average particle size in the range of 0.05 to 1.0 micron.

7. The method of claim 1, where said phosphor comprises from about 52.3 wt. % to about 59.34 wt. % of lanthanum, from about 0.06 wt. % to about 2.97 wt. % of thulium and about 13 wt. % to about 15 wt. % of phosphorus.

8. A thulium activated lanthanum phosphate phosphor having the empirical formula:

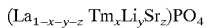

wherein: $0.001 \leq x \leq 0.05$; $0.01 \leq y \leq 0.05$; and $0.0 \leq z \leq 0.05$; formed by a process comprising the steps of:
reacting in an acid medium a dilute solution comprising a source of lanthanum, a source of thulium, a source of lithium, a source of strontium and an organic precursor providing a source of phosphorus to form a sol, drying said sol to form a gel and then a xerogel;
converting said xerogel into a fine powder; and
thermally decomposing said powder at a temperature below a solid state reaction temperature to obtain said phosphor, said phosphor having spherical particles with an average particle size in the range of 0.05 to 2.0 microns.

9. The phosphor of claim 8, wherein said source of lanthanum, said source of thulium, and said organic precursor providing a source of phosphorus are reacted in an acid medium.

10. The phosphor of claim 8, wherein said source of lanthanum and thulium is selected from the groups consisting of respective nitrates, and said organic precursor providing a source of phosphorus is trimethyl phosphate.

11. The phosphor of claim 8, wherein said source of lanthanum and thulium is selected from the groups consisting of respective hydroxides, and said organic precursor providing a source of phosphorus is trimethyl phosphate.

12. The phosphor of claim 8, wherein said source of lanthanum and thulium is selected from the groups consisting of respective nitrates, and said organic precursor providing a source of phosphorus is trimethyl phosphate.

13. The phosphor of claim 8, wherein said gel is thermally decomposed in an open atmosphere, at a temperature equal to or less than 950° C.

14. The phosphor of claim 8, wherein said gel is dried to form a xerogel and said xerogel is crushed to form a powder prior to thermal decomposition.

15. The phosphor of claim 8, wherein said phosphor comprises from about 52.3 wt. % to about 59.34 wt. % of lanthanum, from about 0.06 wt. % to about 2.97 wt. % of thulium and about 13 wt. % to about 15 wt. % of phosphorous.

* * * * *